United States Patent [19]

Tackett

[11] Patent Number: 5,037,161

[45] Date of Patent: Aug. 6, 1991

[54] COMBINATION ISOLATION AND CHECK VALVE FOR AN ADAPTIVE BRAKING SYSTEM

[75] Inventor: Wendell D. Tackett, South Bend, Ind.

[73] Assignee: Allied-Signal Inc., Morristown, N.J.

[21] Appl. No.: 529,002

[22] Filed: May 24, 1990

[51] Int. Cl.[5] .............................................. B60T 8/32
[52] U.S. Cl. .................................... 303/116; 137/112; 303/14; 303/68; 303/84.2; 303/119; 303/117
[58] Field of Search ............... 303/113, 114, 115, 116, 303/117, 119, 118, 10, 68, 13, 84.1, 14, 84.2, 100, 110; 188/181 A, 358, 359; 137/112; 60/545, 565

[56] References Cited

U.S. PATENT DOCUMENTS

| | | | |
|---|---|---|---|
| 4,685,749 | 8/1987 | Otsuki et al. | 137/112 X |
| 4,838,620 | 6/1989 | Sypniewski | 303/116 |
| 4,962,975 | 10/1990 | Kervagoret | 303/119 X |

*Primary Examiner*—Douglas C. Butler
*Attorney, Agent, or Firm*—Larry J. Palguta; Ken C. Decker

[57] ABSTRACT

The combination isolation and check valve includes a valve member (80, 180) which has a reduced diameter section (82, 182) and an enlarged diameter section (84, 184) disposed in respective bore sections (70, 74) separated by an intermediate diameter bore section (72). The valve member can be displaced by increased fluid pressure to sealingly engage a seal (95) that isolates a master cylinder (12) from an adaptive braking system (10, 120). A flapper valve mechansm (110) that places an rifice (114) at a valve member end opening (96A) communicating with a longitudinal opening (96) and a transverse opening (93). The orifice (114) reduces pressure transmitted from a pump (45) to the bore (22) containing the valve member (80) without restricting fluid flow between the master cylinder (12) and an associated wheel brake (50). The valve mechanism (210) may be disposed in a passage (41) that communicates with the valve member (180).

25 Claims, 2 Drawing Sheets

COMBINATION ISOLATION AND CHECK VALVE FOR AN ADAPTIVE BRAKING SYSTEM

The present invention relates generally to a valve for an adaptive braking system, and in particular to a combination isolation and check valve for utilization in such a system.

Adaptive braking systems have been used in automotive vehicles and aircraft. Various systems utilize a wide variety of components, systems connections, and valving devices, both electrically and hydraulically operated. Many systems utilize electric valve means to isolate hydraulically the master cylinder or pressure producing device from the adaptive braking system when such system is operating. U.S. Pat. No. 4,962,975 discloses a pilot controlled valve working in conjunction with a check valve that isolates the master cylinder during adaptive braking system operation. It is highly advantageous to provide an isolating valve which accomplishes functions in addition to isolating the master cylinder. The isolating valve should operate so that in case of a sudden or "spike apply" of the brakes by the vehicle operator, the sudden increase in fluid pressure will be transmitted to the brakes and not blocked from transmission to the brakes by an unwanted shifting of the valve during this condition. The valve should include a fluid restriction so that fluid pressure received from a pump is appropriately reduced before being communicated via a solenoid to a wheel brake. The valve should also permit the introduction of additional fluid within the adaptive braking system during only the time when fluid is actually needed by the system, and not when other components could cause the introduction of fluid when such is not needed Additionally, the valve should result in the elimination of other components, the elimination of fluid passages and connections, and an overall size reduction and weight saving in addition to the corresponding cost savings.

The present invention provides solutions to the above problems by providing an isolation and check valve, comprising a valve body having therein a stepped bore comprising a small diameter bore section, an intermediate diameter bore section, and a large diameter bore section, an isolation/check valve member disposed within said stepped bore and comprising a reduced diameter section extending into an enlarged diameter section, resilient means disposed within said stepped bore and biasing the valve member, the reduced diameter section having seal means engaging sealingly said small diameter bore section, sealing means disposed within said large diameter bore section and about said valve member, the sealing means disposed between shoulders of said large diameter bore section and enlarged diameter section of the valve member, a seal mechanism disposed at the enlarged diameter section, the enlarged diameter section having a transverse opening communicating with a longitudinal opening extending to an end opening at one end of said valve member, the one end of said valve member having a valve mechanism disposed at the one end opening, enclosure means enclosing a second end of said bore, a first passage communicating with said intermediate diameter bore section, a second passage communicating with said large diameter bore section, a third passage communicating with said large diameter bore section and fluidly separated from said second opening by the seal mechanism, and fourth and fifth passages communicating with said small diameter bore section and fluidly separated from said intermediate diameter bore section by said seal means, so that fluid pressure communicated via said first passage communicates through said intermediate diameter bore section to said second passage, and a communication of increased fluid pressure from said third passage causing said valve member to be displaced so that said sealing means engages sealingly the shoulders and isolates the first passage from said second passage while permitting said third passage to communicate with said second passage via said valve mechanism, longitudinal opening, and transverse opening such that the increased fluid pressure may be communicated with said second passage.

One way of carrying out the invention is described in detail below with reference to the drawings which illustrate an embodiment in which.

Figure 1:
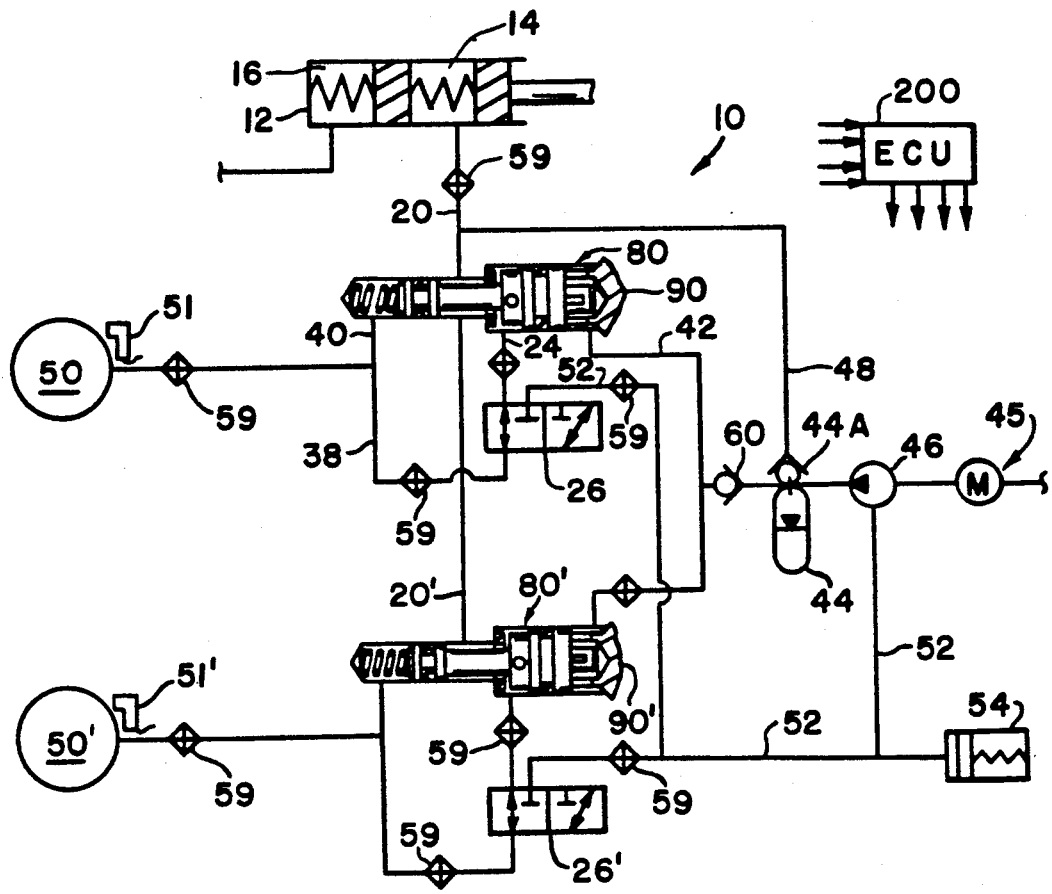
FIG. 1 is a schematic illustration of a portion of an adaptive braking system utilizing the combination isolation and check valve of the present invention.

FIG. 1 comprises a schematic illustration of an adaptive braking system referenced generally by numeral 10. System 10 includes a master cylinder 12 having primary and secondary pressure chambers 14, 16. Primary pressure chamber 14 communicates with a first passage 20 which connects with a stepped bore 22 of a combination isolation and check valve indicated generally by reference numeral 80. First passage 20 communicates via stepped bore 22 with a second passage 24 that connects with a two-position, three-way electric solenoid valve 26. Electric solenoid valve 26 communicates, in a deactivated position, the second passage 24 with a fourth passage 38 that connects with a wheel brake 50. Fourth passage 38 communicates with a fifth or end passage 40 that connects with the stepped bore 22. Stepped bore 22 also communicates with a third passage 42 that connects via an accumulator 44 with a pumping section 46 of a pump 45. Accumulator 44 communicates both with the third passage 42 and a sixth passage 48 that connects with first passage 20. The solenoid valve 26 communicates with a seventh passage 52 which includes a sump 54 and a connection with the pumping section 46. Primary chamber 14 also communicates in the same manner with an identical combination isolation and check valve 80', solenoid means 26' and wheel brake 50'. The connections for both combination isolation and check valves and related components are the same. System 10 includes various fluid filters 59, and check valve 60. Accumulator 44 includes a pull-off type check valve 44A so that if the accumulator receives pressurized fluid beyond a certain quantity, the check valve 44A is opened and pressurized fluid from the pump 46 may communicate via passage 48 with the master cylinder 12. Secondary pressure chamber 16 communicates with an identical subsystem for the other brakes (not shown) The system 10 operates by means of an electronic control unit (ECU) 200 and wheel speed sensors 51, 51'.

Figure 2:
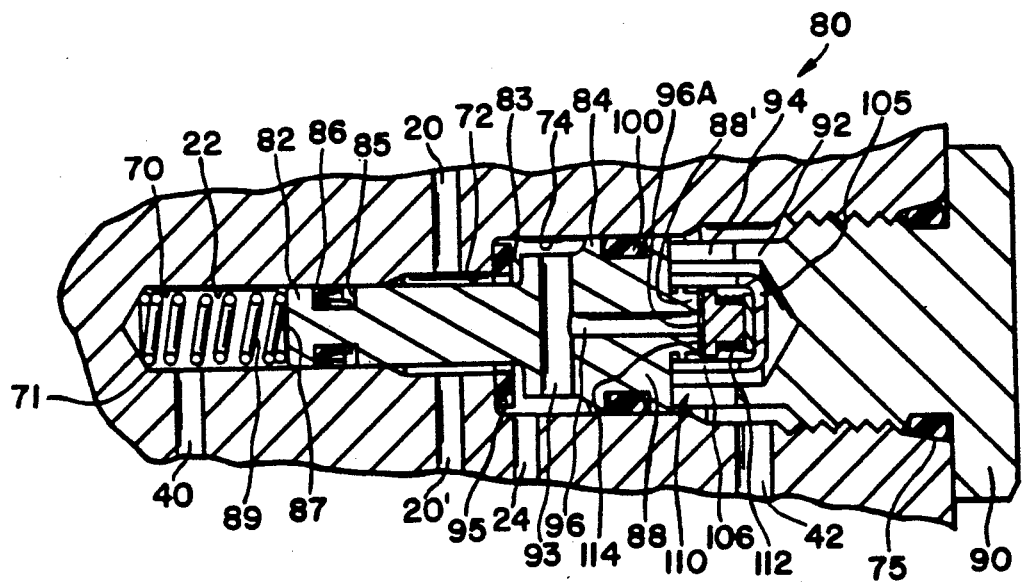
FIG. 2 is an enlarged section view of the combination isolation and check valve of the present invention.

Referring to FIG. 2, a more detailed illustration of the combination isolation and check valve is provided. The stepped bore 22 comprises a small diameter bore section 70 which communicates with an intermediate diameter bore section 72 and a large diameter bore section 74. End passage 40 communicates with the one end 71 of small diameter bore section 70, passage 20 communicates with the intermediate diameter section 72 as does the passage 20'60 which provides the communication of fluid from primary chamber 14 to valve 80'. Large diameter bore section 74 communicates with second and third passages 24 and 42. Disposed within stepped bore 22 is valve member 80 which comprises a reduced diameter section 82 that extends via shoulder 83 into enlarged diameter section 84. Small diameter bore section 70 includes resilient means 89 which biases one end 87 of valve member 80. Reduced diameter section 82 includes a recess 85 containing lip seal means 86 which sealingly engages the small diameter bore section 70. Enclosure means 90 encloses an opposite end 75 of stepped bore 22 and includes an axial extension 92 which provides a limit stop for valve member 80. Extension 92 includes lateral openings 94 so that fluid may communicate from third passage 42 with opposite end 88 of valve member 80. A sealing means 95 is located within the stepped bore between the intermediate bore section 72 and large bore section 74 and for sealing engagement with the shoulder 83 of valve member 80. Valve member 80 includes a transverse opening 93 which communicates with a longitudinal opening 96 at opposite end 88 of valve member 80. A seal mechanism 100 is disposed about enlarged diameter section 84 of valve member 80 in order to provide a fluid separation between second passage 24 and third passage 42. Opposite end 88 of valve member 80 includes thereabout a cap 105 which includes side openings 106 for fluid communication with third passage 42. Cap 105 is attached to the opposite end of valve member 80 by means of the valve extension 88'. Cap 105 houses a flapper valve mechanism 110 which includes a spring 112 and a lateral orifice 114. Lateral orifice 114 is disposed at an end opening 96A of longitudinal opening 96. Flapper valve mechanism 110 can also be disposed separate from valve member 80, such as in third passage 42.

The combination isolation and check valve operates as part of the adaptive braking system 10 as follows: during normal, non-adaptive braking, fluid pressure generated by master cylinder 12 and primary pressure chamber 14 is communicated via first passage 20 to intermediate diameter bore section 72. The fluid passes through bore section 72, past sealing means 95, and to the large diameter bore section 74 for communication with second passage 24. Fluid flows through second passage 24 to solenoid 26, through the solenoid to fourth passage 38 and wheel brake 50. The fluid also communicates via fifth or end passage 40 with small diameter bore section 70. When normal braking ceases, the fluid may follow a reverse flow path through the above passages and components toward the master cylinder. When there is an initiation of operation of the adaptive braking system by ECU 200, pump 45 is activated such that pumping section 46 transmits fluid pressure via third passage 42 to large diameter bore section 74 so that valve member 80 translates to the left, as a result of the decay of brake pressure away from wheel brake 50 and the fluid pressure from pump 45, and causes shoulder 83 to sealingly engage sealing means 95 and isolate first passage 20 from second passage 24. During adaptive braking system operation, solenoid valve 26 will either decay braking pressure away from brake 50 via passage 40, small diameter bore section 70, passage 38, and seventh passage 52 to sump 54 and the inlet side of the pumping section 46, or the solenoid valve will permit an increased fluid pressure to be communicated to the wheel brake during a build cycle. During the build cycle, fluid pressure effected by pumping section 46 is transmitted via third passage 42 to large diameter bore section 74 where it is communicated via lateral openings 94, side openings 106, lateral orifice 114, end opening 96A, longitudinal opening 96, transverse opening 93, to second passage 24, solenoid valve 26, and on to brake 50 via the passage 38. Throughout the time period when valve member 80 is in the translated position such that shoulder 83 engages sealing means 95, the master cylinder remains isolated from the adaptive braking system. Throughout the adaptive braking system cycle, brake pressure within the system should remain lower than the pressure created by pump 45 due to the modulation of the solenoid valves such as valves 26, 26'. This will retain combination isolation and check valve member 80 in the translated position. In this translated position, fluid flow to the wheel during build cycles will come from pump 45, through orifice 114 which restricts fluid flow and pressure therethrough, to solenoid 26 and brake 50. If the pressure at brake 50 rises above the pressure at the primary pressure chamber 14 of master cylinder 12, fluid will be permitted to pass by lip seal means 86 to the intermediate diameter bore section 72 for transmission toward the master cylinder. Thus, during a situation where the brake pressure exceeds the master cylinder pressure, the higher pressure within fifth passage 40 can be transmitted past lip seal means 86 and toward first passage 20. If the pressure at brake 50 should approach the pressure at pump 45, which is an indication that there is an insufficient amount of fluid in sump 54 and accumulator 44, then valve member 80 will translate to the right to open the seal between shoulder 83 and sealing means 95 and permit more fluid to flow into circuit 10 from master cylinder 12. When the adaptive braking system ceases operation, fluid will flow, as the brake pedal is released, from brake 50 to the master cylinder as valve member 80 translates to the right and separates shoulder 83 from sealing means 95. During the release phase of braking when the adaptive braking system has terminated operation, flapper valve mechanism 110 can be displaced so that higher fluid pressure within the brake system can be transmitted more quickly through longitudinal opening 96 and also effect a flushing or cleansing of orifice 114.

Figure 3:
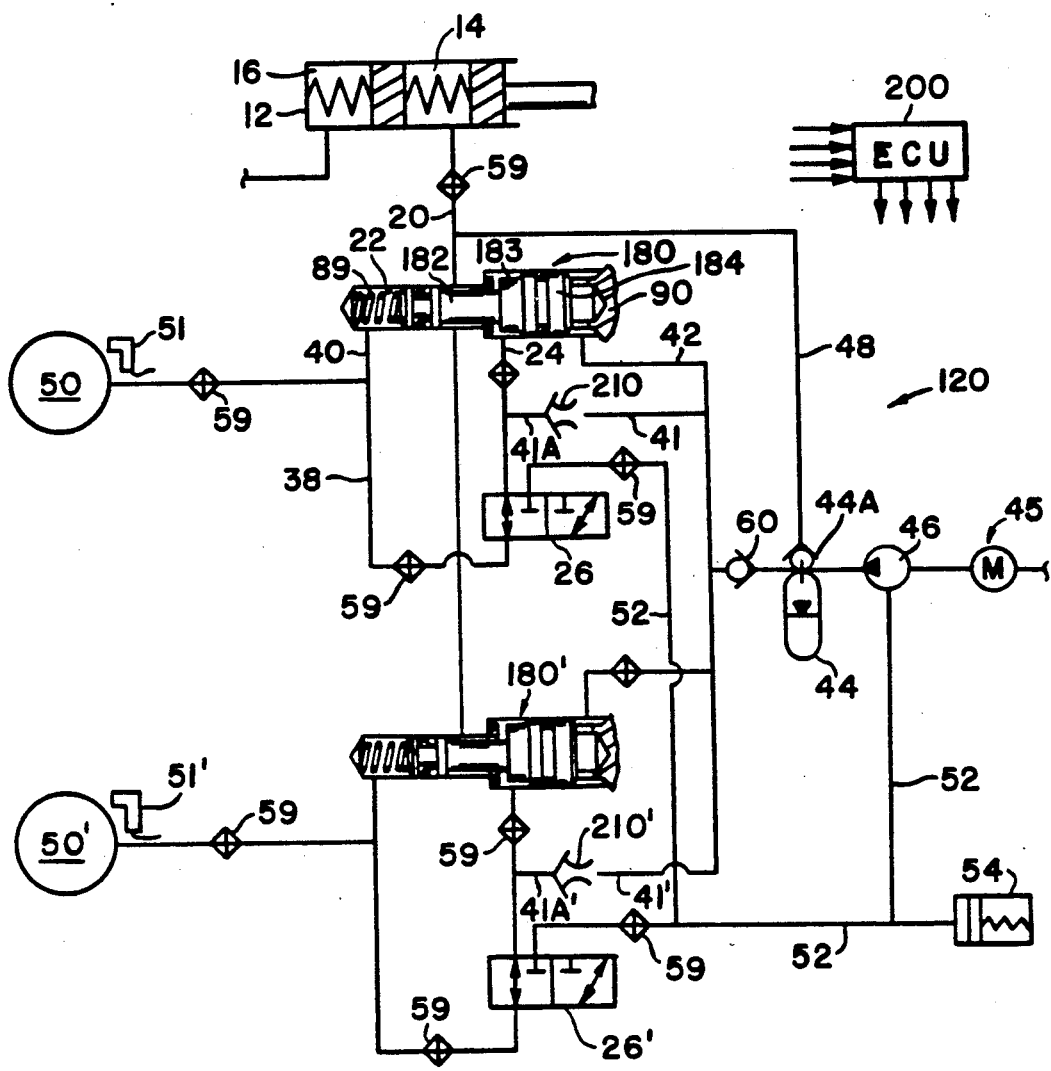
FIG. 3 is a schematic illustration of the adaptive braking system of FIG. 1 which includes a further embodiment of the present invention.

FIG. 3 is a schematic illustration of the adaptive braking system of FIG. 1 which has a further embodiment of the present invention. Similar structure will be identified by the same reference numerals. System 120 includes the master cylinder 12 with pressure chambers 14, 16, first passage 20 communicating with the stepped bore 22 of isolation valve member 180, and a second passage 24 connecting with the two-position, three-way electric solenoid valve 26. Electric solenoid valve 26 communicates, in a deactivated position, the second passage 24 with a fourth passage 38 that connects with a wheel brake 50. Fourth passage 38 communicates with a fifth or end passage 40 that connects with the stepped bore 22. Stepped bore 22 communicates with third passage 42 that connects with an accumulator 44 and a pumping section 46 of a pump 45. Accumulator 44 communicates both with the third passage 42 and a sixth passage 48 that connects with first passage 20. Accumulator 44 includes the pull-off type check valve described previously. Solenoid valve 26 communicates with a seventh passage 52 that includes a sump 54 and a connection with the pumping section 46. Primary pressure chamber 14 of master cylinder 12 also communicates in the same manner with an identical isolation valve member 180', solenoid means 26' and wheel brake 50'. The connections for both isolation and check valves and related components are the same. System 120 further includes a flapper or check valve mechanism 210 that provides an orifice 114 in an eighth passage 41. Secondary pressure chamber 16 of master cylinder 12 communicates with an identical subsystem for the other brakes (not shown). The system 120 operates by means of an electronic control unit (ECU) 200 and wheel speed sensors 51, 51'.

Figure 3A:
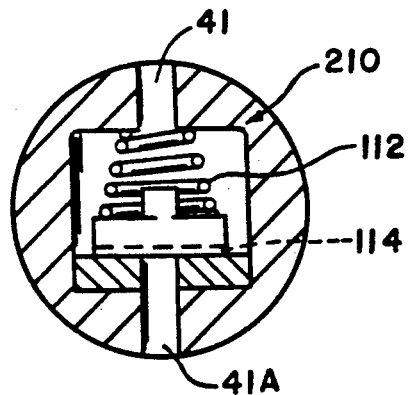
FIG. 3A is an enlarged section view of a check valve mechanism utilized in the embodiment of FIG. 3.

The stepped bore is constructed the same as described above, while isolation valve member 180 comprises a reduced diameter section 182 that extends via shoulder 183 into enlarged diameter section 184. Valve member 180 does not include the longitudinal and transverse passages described above, nor does it have a flapper or check valve mechanism attached thereto. The check valve mechanism 210 is disposed within eighth passage 41 and is illustrated in detail in FIG. 3A. Valve mechanism 210 includes a spring 112 and a lateral orifice 114 which is disposed at passage opening 41A, in the same manner that the above described valve mechanism 110 was constructed and disposed as part of the valve member 80.

As can be seen by comparing FIGS. 1 and 3, the system 120 permits fluid pressure from the pumping section 46 to be communicated by means of eighth passage 41 directly to solenoid valve 26 via restriction 114 of valve mechanism 210. In other words, the pump may communicate increased fluid pressure directly to the solenoid valve means 26 rather than by way of the valve member 80 illustrated in FIG. 1. This permits the elimination of the longitudinal and transverse passages within valve member 80, and also eliminates the attachment of mechanism 110 to the valve member 80. In FIG. 3, valve mechanism 210 is disposed within eighth passage 41 whereby the mechanism restricts fluid flow from the pump to solenoid valve 26 without placing the flow restriction within the normal braking fluid path which exists via first passage 20, bore 22, second passage 24, solenoid valve 26, and fourth passage 38. The combination isolation valve member 180 and valve mechanism 210 operates with system 120 in the same way as described above for system 10. Both systems 10 and 120 operate to provide the same functions.

The present invention provides significant improvements over prior adaptive braking system valves. In a typical prior four solenoid valve adaptive braking system, the present invention will eliminate six check valves and replace four shuttle valves with four combination isolation and check valves in accordance with the present invention. The present invention also permits the utilization of an in-line orifice 114 for valve member 80. Prior designs necessitated the placement of an orifice on the face of the shuttle valve. This can create problems as a result of contamination which may clog the orifice, and also makes manufacture more difficult. The present invention permits the orifice to be provided on the flapper valve mechanism 110 and eliminates the orifice from inclusion in the face of the shuttle valve. Additionally, the present invention provides improved master cylinder isolation during operation of the adaptive braking system. In previous adaptive braking systems, fluid within the system was added from the master cylinder whenever the pump pressure became lower than the master cylinder pressure. This could easily occur during build cycles and could necessitate an oversized sump or accumulator. The present invention permits the introduction of fluid into the adaptive braking system from the master cylinder only when the brake pressure nears the pump pressure, which is the only true indication that more fluid is needed within the system. Thus, the pump pressure will be allowed to drop below the master cylinder pressure as long as the modulated brake pressure is lower. Prior adaptive braking system shuttle valves often provided an orifice within the shuttle valve which would be placed within the system fluid flow path inadvertently during a spike apply of the brakes by the vehicle operator. This was undesirable because the sudden increase in brake pressure effected thereby needed to be transmitted directly to the brake for the emergency situation. The valve of the present invention eliminates the possibility of the orifice being provided within the fluid flow path during a spike apply. A spike apply would transmit fluid pressure directly from first passage 20 to second passage 24 without any intervention by orifice 114. As follows from this, the present invention also eliminates orifice 114 from the normal braking fluid path. Isolation and check valve member 80 may operate accordingly without the placement of any restriction within the normal brake path. Finally, the present invention enables the manufacture of a hydraulic modulator which contains therein the shuttle valves and solenoid valves of the system such that holes or passages within the hydraulic modulator will be reduced by one-half and the number of plugged holes will be reduced by approximately two-thirds. The casting weight will be reduced substantially as a result of this.

I claim:

1. A combination isolation and check valve, comprising a valve body having therein a stepped bore comprising a small diameter bore section, an intermediate diameter bore section, and a large diameter bore section, an isolation/check valve disposed within said stepped bore and comprising a reduced diameter section extending into an enlarged diameter section, resilient means disposed within said stepped bore at one end and biasing the reduced diameter section, the reduced diameter section having seal means thereabout engaging sealingly said small diameter bore section, sealing means disposed within said large diameter bore section and about said isolation/check valve, the sealing means disposed opposite a valve shoulder located between said reduced and enlarged diameter sections, a seal mechanism disposed at the enlarged diameter section, the enlarged diameter section having a transverse opening communicating with a longitudinal opening extending to an end opening at one end of said isolation/check valve, the one end of said isolation/check valve having a valve mechanism disposed at the one end opening, the valve mechanism having orifice means communicating with said end opening, enclosure means enclosing a second end of said bore, a first passage communicating with said intermediate diameter bore section, a second passage communicating with said large diameter bore section, a third passage communicating with said large diameter bore section and fluidly separated from said second opening by the seal mechanism disposed at said enlarged diameter section of the isolation/check valve, and an end passage communicating with said second passage and small diameter bore section and fluidly separated from said intermediate diameter bore section by said seal means, so that fluid pressure communicated via said first passage communicates through said intermediate diameter bore section to said second passage for communication with said end passage, and a communication of increased fluid pressure from said third passage causing said isolation/check valve to be displaced so that said valve shoulder engages sealingly the sealing means and isolates the first passage from said second passage while permitting said third passage to communicate with said second passage via said orifice means, longitudinal opening, and transverse opening such that the increased fluid pressure may be communicated with said end passage.

2. The valve in accordance with claim 1, wherein said seal means comprises lip seal means so that should fluid pressure within the end passage exceed fluid pressure within the first passage, fluid may flow past the lip seal means and toward said first passage.

3. The valve in accordance with claim 2, wherein said valve mechanism comprises a flapper valve which is biased by a spring.

4. The valve in accordance with claim 3, wherein said flapper valve comprises the spring housed by a cap that is connected with the one end of said isolation/check valve.

5. The valve in accordance with claim 4, wherein said one end of the isolation/check valve has an extension which engages said cap, the cap having side openings for the flow of fluid therethrough.

6. The valve in accordance with claim 5, wherein the enclosure means comprises an axial extension which may abut the one end of said isolation/check valve to provide a limit stop for translational movement of the isolation/check valve toward said third passage.

7. The valve in accordance with claim 6, wherein the axial extension of the enclosure means comprises lateral openings to permit fluid flow to be communicated between the third passage and the flapper valve.

8. The valve in accordance with claim 7, wherein the first passage communicates with a master cylinder, the second passage and end passage communicate with electric valve means, the third passage communicates with pump means, and the end passage also communicates with a brake.

9. The valve in accordance with claim 8, wherein the isolation/check valve, passages, master cylinder, brake, electric valve means, and pump means comprise part of an adaptive braking system.

10. An adaptive braking system containing a combination isolation and check valve, comprising master cylinder means communicating with first passage means that communicates with a stepped bore of said valve, second passage means communicating the bore with electric valve means, third passage means communicating the bore with pump means, fourth passage means communicating the electric valve means with a wheel brake, fifth passage means communicating between said fourth passage and a small diameter bore section of said stepped bore, sixth passage means communicating between accumulator means and said first passage means, seventh passage means communicating between said pump means and said electric valve means, the stepped bore comprising said small diameter bore section, an intermediate diameter bore section, and a large diameter bore section, the first passage means communicating with the intermediate bore section and the second and third passage means communicating with said large diameter bore section, the valve having reduced and enlarged diameter sections, resilient means disposed in the bore and biasing the valve, the reduced diameter section having seal means thereat which sealingly engages the small diameter bore section and separates the fourth and fifth passage means from said first passage means, a first seal disposed at the enlarged diameter section of the valve to separate the second and third passage means from one another, a second seal disposed within said stepped bore and for sealing engagement with a valve shoulder disposed between said reduced and enlarged diameter sections, the enlarged diameter section of the valve including a transverse opening communicating with a longitudinal opening that terminates in an end opening at one end of said valve, the end opening having fluid valve means, and enclosure means enclosing an end of said stepped bore, fluid pressure being communicated via said first passage means to said intermediate bore section, large diameter bore section, and second passage means for communication with the fourth and fifth passage means via the electric valve means, and increased fluid pressure transmitted from said pump means via said third passage means to the one end of the valve causing said valve to translate such that the valve shoulder engages sealingly the second seal and isolates the first passage means from the second passage means while permitting the third passage means to communicate via the fluid valve means, longitudinal opening and transverse opening with said second passage means.

11. The system and valve in accordance with claim 10, wherein the fluid valve means includes an orifice which restricts fluid flow between the third passage means and longitudinal opening.

12. The system and valve in accordance with claim 11, wherein the fluid valve means is biased by a spring such that the orifice may be moved away from the end opening.

13. The system and valve in accordance with claim 12, wherein the seal means at the reduced diameter section comprises a lip seal so that when fluid pressure in the fifth passage means exceeds fluid pressure within the first passage means, fluid may flow past the lip seal and toward said first passage means.

14. The system and valve in accordance with claim 13, wherein the electric valve means comprises a two-position, three-way solenoid valve.

15. The system and valve in accordance with claim 14, wherein the seventh passage means communicates with sump means.

16. The system and valve in accordance with claim 15, wherein the fluid valve means comprises a cap attached to the one end of said valve, the cap having side openings for communication of fluid between said third passage means and orifice.

17. The system and valve in accordance with claim 16, wherein the enclosure means comprises an axial extension which provides a limit stop for translational movement of the valve toward said third passage means, the axial extension including lateral passages for fluid flow therethrough.

18. An isolation and check valve, comprising a valve body having therein a stepped bore comprising a small diameter bore section, an intermediate diameter bore section, and a large diameter bore section, an isolation/check valve member disposed within said stepped bore and comprising a reduced diameter section extending into an enlarged diameter section, resilient means disposed within said stepped bore and biasing the valve member, the reduced diameter section having seal means engaging sealingly said small diameter bore section, sealing means disposed within said large diameter bore section and about said valve member, the sealing means disposed between shoulders of said large diameter bore section and enlarged diameter section of the valve member, a seal mechanism disposed at the enlarged diameter section, the enlarged diameter section having a transverse opening communicating with a longitudinal opening extending to an end opening at one end of said valve member, the one end of said valve member having a valve mechanism disposed at the one end opening, enclosure means enclosing a second end of said bore, a first passage communicating with said intermediate diameter bore section, a second passage communicating with said large diameter bore section, a third passage communicating with said large diameter bore section and fluidly separated from said second opening by the seal mechanism, and an end passage communicating with said small diameter bore section and fluidly separated from said intermediate diameter bore section by said seal means, so that fluid pressure communicated via said first passage communicates through said intermediate diameter bore section to said second passage, and a communication of increased fluid pressure from said third passage causing said valve member to be displaced so that said sealing means engages sealingly the shoulders and isolates the first passage from said second passage while permitting said third passage to communicate with said second passage via said valve mechanism, longitudinal opening, and transverse opening such that the increased fluid pressure may be communicated with said second passage.

19. The valve in accordance with claim 18, wherein the valve means includes an orifice which restricts fluid flow between the third passage means and longitudinal opening.

20. The valve in accordance with claim 19, wherein the enclosure means comprises an axial extension which may abut the end of said valve member to provide a limit stop for translational movement of the valve member toward said third passage.

21. In combination an isolation and check valve, comprising a valve body having therein a stepped bore comprising a small diameter bore section, an intermediate diameter bore section, and a large diameter bore section, an isolation valve member disposed within said stepped bore and comprising a reduced diameter section extending into an enlarged diameter section, resilient means disposed within said stepped bore and biasing the valve member, the reduced diameter section having seal means engaging sealingly said small diameter bore section, sealing means disposed within said large diameter bore section and about said valve member, the sealing means disposed between shoulders of said large diameter bore section and enlarged diameter section of the valve member, a seal mechanism disposed at the enlarged diameter section, an enclosure means enclosing a second end of said bore, a first passage communicating with said intermediate diameter bore section, a second passage communicating with said large diameter bore section, a third passage communicating with said large diameter bore section and fluidly separated from said second passage by the seal mechanism, an end passage communicating with said small diameter section and fluidly separated from said intermediate diameter bore section by said seal means, fourth passage means communicating between said third passage means and said second passage means, and a valve mechanism disposed within said fourth passage means to restrict fluid flow in one direction and permit unrestricted fluid flow in an opposite direction at a predetermined pressure level, so that fluid pressure received via said first passage communicates through said intermediate diameter bore section to said second passage, and a communication of increased fluid pressure from said third passage causing said valve member to be displaced so that said sealing means engages sealingly the shoulders and isolates the first passage from said second passage, and the increased fluid pressure communicated from the third passage to the fourth passage restricted by the valve mechanism.

22. The combination in accordance with claim 21, wherein the valve mechanism comprises a check valve having a lateral restriction through which fluid may flow in said one direction.

23. The combination in accordance with claim 22, wherein the valve mechanism is biased by a spring so that fluid flow in the opposite direction opens the valve mechanism at said predetermined pressure level and permits fluid flow therethrough.

24. The combination in accordance with claim 23, further comprising solenoid valve means wherein the second, fourth, and end passages communicate with said solenoid valve.

25. The combination in accordance with claim 24, further comprising master cylinder means communicating with said first passage and with another passage controlled by a hold-off valve of an accumulator.

* * * * *